United States Patent [19]

Ohki

[11] Patent Number: 4,887,156
[45] Date of Patent: Dec. 12, 1989

[54] METHOD AND SYSTEM FOR TRANSFORM CODING OF VIDEO SIGNALS

[75] Inventor: Junichi Ohki, Tokyo, Japan

[73] Assignee: NEC Corporation, Japan

[21] Appl. No.: 187,380

[22] Filed: Apr. 28, 1988

[30] Foreign Application Priority Data

Apr. 30, 1987 [JP] Japan .................................. 62-108258

[51] Int. Cl.[4] ...................... H04N 7/133; H04N 7/137
[52] U.S. Cl. .................................... 358/133; 358/105; 358/135; 358/136
[58] Field of Search ................ 358/105, 133, 135, 136, 358/138

[56] References Cited

U.S. PATENT DOCUMENTS 4,447,886 5/1984 Meeker .................................. 358/133
4,541,012 9/1985 Tescher ................................ 358/133

Primary Examiner—Howard W. Britton
Attorney, Agent, or Firm—Laff, Whitesel, Conte & Saret

[57] ABSTRACT

A coding system in accordance with the present invention includes a control signal generating circuit for generating a control signal indicative of a quantity of band limitation by calculating a ratio of an area of motion from an input video signal. A band limiter band-limits a transform-coded video signal in response to the control signal. For example, when the picture is stationary or little moved, the transform-coded video signal is not band-limited at all; when the area of motion is medium, high frequency components of a part of the video signal are omitted to cope with an increase in the amount of data generated; and when the area of motion is extremely great, many high frequency components are omitted to accommodate a rash of data. A prediction coding circuit predictively codes the band-limited video signal before the latter is sent out to a transmission path.

3 Claims, 5 Drawing Sheets

METHOD AND SYSTEM FOR TRANSFORM CODING OF VIDEO SIGNALS

BACKGROUND OF THE INVENTION

The present invention relates to a method and a system for transform coding of video signals.

Among various kinds of transform coding, discrete cosine transform (DCT) coding disclosed in U.S. Pat. No. 4,541,012 is best known in the art. A problem with DCT coding heretofore pointed out is that as the motion of an input video signal becomes noticeable, the amount of data generated is sharply increased to prevent the coding rate and the transmission rate on a transmission path from being matched to each other. It is a common practice to cope with such a problematic situation by interrupting coding and thereby suppressing a rash of data. However, when coding is interrupted as stated, a picture reproduced suffers from discontinuity with the result that the motion appears unnatural to offend the eye.

SUMMARY OF THE INVENTION

It is therefore an object of the present invention to provide a method and a system for transform coding capable of controlling the amount of data which are adaptively produced in association with the area of motion of a video signal.

A coding system in accordance with the present invention includes a control signal generating circuit for generating a control signal indicative of a quantity of band limitation by calculating a ratio of an area of motion from an input video signal. A band limiter band-limits a transform-coded video signal in response to the control signal. For example, when the picture is stationary or little moved, the transform-coded video signal is not band-limited at all; when the area of motion is medium, high frequency components of a part of the video signal are omitted to cope with an increase in the amount of data generated; and when the area of motion is extremely great, many high frequency components are omitted to accommodate a rash of data. A prediction coding circuit predictively codes the band-limited video signal before the latter is sent out to a transmission path.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENTS

Figure 1:
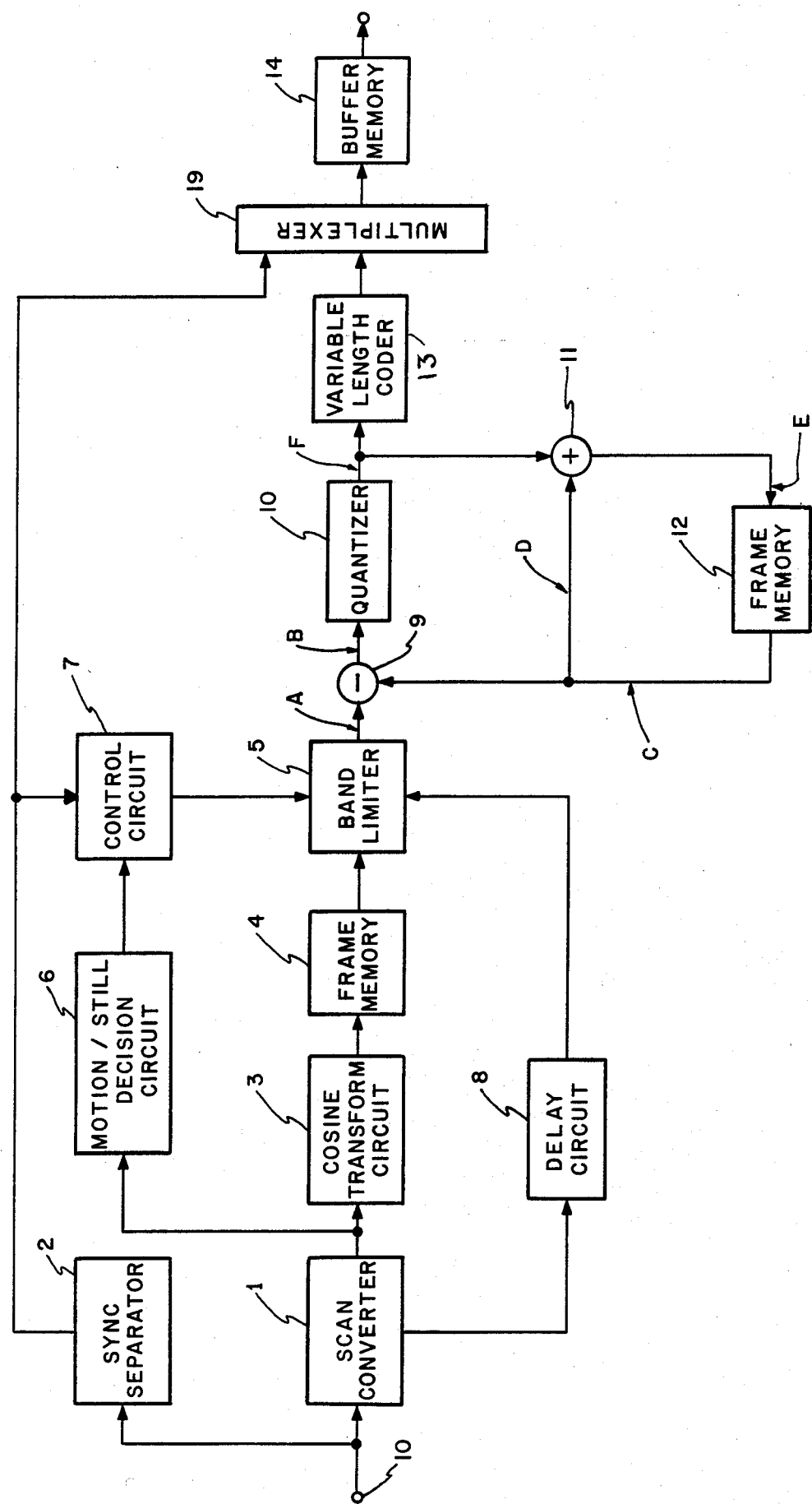
FIG. 1 is a block diagram of a coding system schematically showing a first embodiment of the present invention.

Referring to FIG. 1 of the drawings, a first embodiment of the present invention is shown. A video signal applied to a terminal 10 is fed to a scan converter 1 and a sync separator 2. The scan converter 1 converts the input video signal into scan converted blocks, each having a predetermined size, the scan converted blocks being delivered to a cosine transform circuit 3 and a motion/still decision circuit 6. Fed from the scan converter 1 to a delay circuit 8 are block start signals, each being representative of the start of a scan converted block. The sync separator 2 separates a horizontal sync signal from the video signal and, based on the sync signal, generates frame pulses which are indicative of the starts of picture frames. The frame pulses are routed to a control circuit 7. The cosine transform circuit 3 subjects the scan converted block to cosine transform to produce transform coefficients which are sent to a frame memory 4. The motion/still decision circuit 6 accumulates the absolute values of frame differences of pixels in the scan converted block. When the sum of those absolute values is greater than a predetermined threshold, the circuit 6 decides that the block is a moving block; otjerwise, it decides that the block is a stationary block. In the illustrative embodiment, the circuit 6 produces a (logical) ONE when the block is a moving block and a (logical) ZERO when it is a stationary block. The decision output of the circuit 6 is fed to the control circuit 7 as a decision signal.

The control circuit 7 delivers to a band limiter 5 a band limit signal which is representative of a particular band limiting width in response to the decision signal, as described in detail later.

The frame memory 4 delays the output of the cosine transform circuit 3, i.e., transform coefficients by a period of time (about one frame) which is needed for the band limiting width to be determined by the motion/-still decision circuit 6 and the control circuit 7. The delayed coefficients from the frame memory 4 is applied to the band limiter 5. On the other hand, the delay circuit 8 delays each block start signal outputted by the scan converter 1 by a period of time which is the sum of a period of time necessary for cosine transform and the delay provided by the frame memory 4.

In response to the band limit signal from the control circuit 7, the band limiter 5 limits the band of the input signal by omitting the transform coefficients which are fed thereto from the frame memory 4, as described later. A subtractor 9 subtracts a prediction signal which is outputted by a frame memory 12 from a band-limited signal which is outputted by the band limiter 5, the resulting prediction error signal being applied to a quantizer 10. The quantizer 10 quantizes the prediction error signal and delivers the quantized signal to an adder 11 and a variable length coder 13. The adder 11 adds the quantized signal from the quantizer 10 and the prediction signal from the frame memory 12, producing a locally decoded signal. Delaying the locally decoded signal by about one frame period, the frame memory 12 delivers its output to the subtractor 9 and adder 11 as the prediction signal. The variable length coder 13 subjects the quantized signal from the quantizer 10 to variable length coding by using Huffman code or like efficient code, the output of the coder 13 being applied to a multiplexer 19. The multiplexer 19 multiplexes the variable length code from the coder 13 and a synchronizing signal and feeds the multiplexed signal to a buffer memory 14. The buffer memory 14 in turn supplies the variable length code to a transmission path while matching it to the transmission rate of the path. For details of the scan converter 1, cosine transform circuit 3 and motion/still decision circuit, a reference may be made to U.S. Pat. Nos. 4,371,895, 4,541,012 and 4,667,233, respectively, which are incorporated herein by reference.

Figure 2:
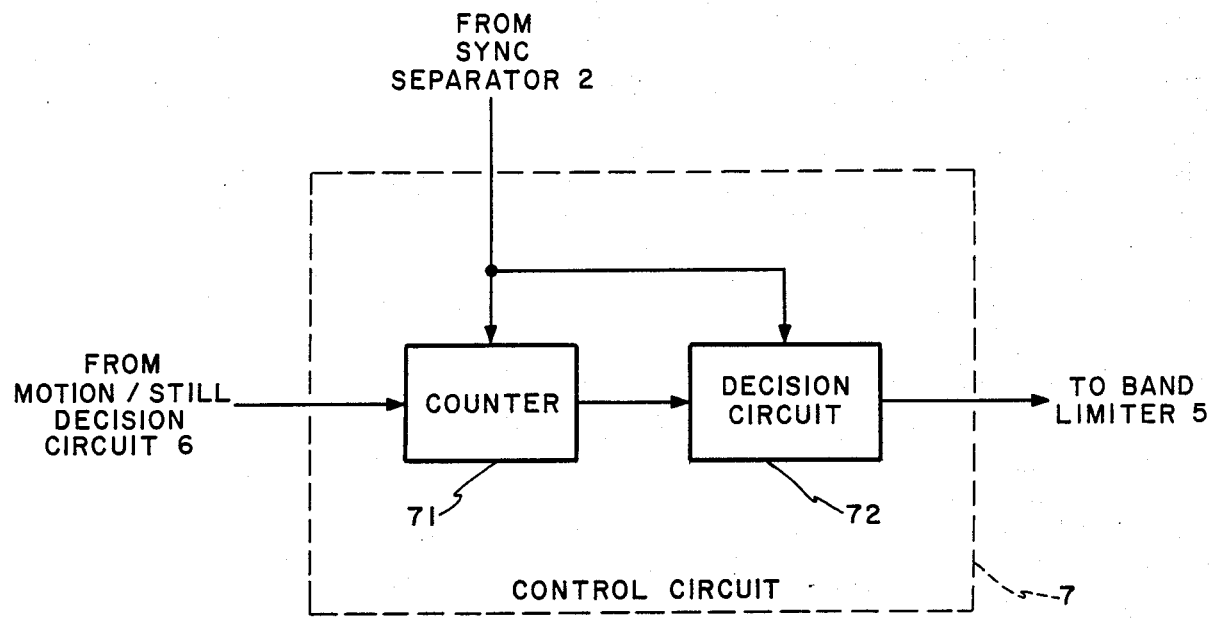
FIGS. 2 and 3 are circuit diagrams each showing a part of the present invention in detail.

Referring to FIG. 2, a specific structure of the control circuit 7 is shown. The control circuit 7 is made up of a counter 71 and a decision circuit 72. The counter 71 is reset by a frame pulse and counts moving block decision signals, i.e. the number of moving blocks, which are ouputted by the motion/still decision circuit 6. The decision circuit 72 takes in the number of moving blocks in synchronism with frame pulses. The circuit 72 compares the number of moving blocks with some predetermined thresholds to determine the band limiting width, i.e. the amount of coefficients to be omitted. For example, when the area of still or that of motion is extremely little, the circuit 72 produces a control signal for outputting a great number of transform coefficients; when the still or the motion has an extremely large area, it produces a control signal for outputting only a small number of coefficients. Such a control signal outputted by the decision circuit 72 is applied to the band limiter 5.

Figure 3:
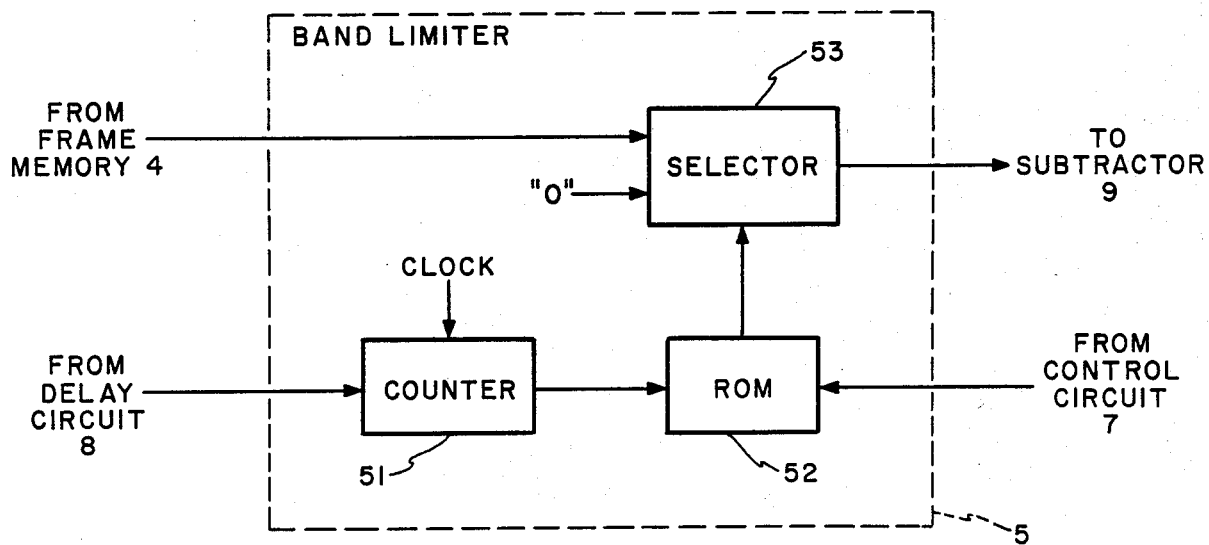
Figures 4, 5:
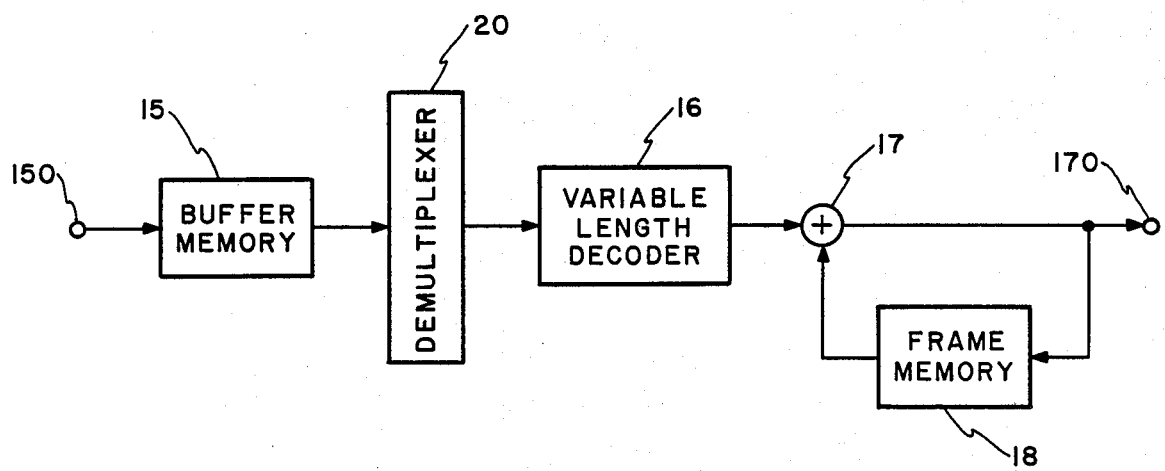
FIG. 4 is a diagram for explaining a picture block for transform coding.
FIG. 5 is a schematic block diagram of a decoding system for the coding system of FIG. 1.

FIG. 3 shows a specific structure of the band limiter 5 which is implemented with a coefficient omitting circuit. The coefficient omitting circuit 5 comprises a counter 51, a read only memory (ROM) 52, and a selector 53. Here, assume that the scan converter 1 converts the input video signal into 8-sample by 8-line blocks, and that transform coefficients produced by cosine transform of each block are fed in the order of coefficients #0 to #63, as shown in FIG. 4. In FIG. 4, the coefficient #0 is a DC component and the frequency sequentially increases with the number assigned to the coefficient, the coefficient #63 having the highest frequency. The counter 51 is reset by the block start signal from the delay circuit 8 and counts clock pulses from 0 to 63. The output of the counter 51 is applied to the ROM 52 as an address. Stored in the ROM 52 are tables which are adapted to produce a selection signal for omitting the transform coefficients in association with the area of motion of the video signal. For example, to provide a comparatively wide band, use is made of a table for outputting ONEs throughout the addresses 0 to 63; to provide a medium band, use is made of a table for outputting ONEs for the addresses 0 to 35 and outputting ZEROs for the addresses 36 to 63; to provide a comparatively narrow band, use is made of a table for outputting ONEs for the addresses 0 to 14 and ZEROs for the address 15 to 63. The selection of these tables is effected by a control signal which is fed from the control circuit 7. In this particular example, the address of the ROM 52 may be constituted by upper two bits assigned to the selection of tables and lower six bits assigned to the designation of #0 to #63 of each table, i.e. eight bits in total. When the selection signal from the ROM 52 is a ONE, the selector 53 outputs the transform coefficients from the frame memory 4. When the selection signal is a ZERO, the selector 53 produces ZEROs. The output of the selector 53 are routed to the subtractor 9 as an output of the coefficient omitting circuit 5. As described, the band is limited by replacing transform coefficients having high frequency components with ZEROs. While the structure and operation of the coefficient omitting circuit 5 have been described with respect to only three different magnitudes of motion, the motions may be divided into a greater number of kinds so as to control generated data more smoothly.

Referring to FIG. 5, there is shown in a block diagram a decoding system operable to decode a coded signal which is outputted by the coding system of FIG. 1. As well known in the art, the decoding system includes a buffer memory 15 for temporarily storing a coded signal from the coding system. The coded signal read out of the buffer memory 15 is demultiplexed by a demultiplexer 20 into a coded video signal and a synchronizing signal. The coded video signal is applied to a variable length decoder 16. On the other hand, the synchronizing signal is used to produce various kinds of timing signals which the decoding system uses, although not shown for the simplicity of description. The variable length decoder 16 decodes the coded video signal from the buffer memory 15 so as to recover a prediction error signal, the prediction error signal being applied to an adder 17. The adder 17 adds the prediction error signal and a prediction signal which is delivered to the adder 17 from a frame memory 18, thereby producing a decoded signal. The decoded signal is fed to a terminal 170 as an output of the decoding system while being fed to the frame memory 18. The frame memory 18 delays the decoded signal by about one frame period and feeds the resulting signal to the adder 17 as the prediction signal.

It is to be noted that the position of the band limiter 5 is not limited to the position shown in FIG. 1 which immediately precedes the subtractor 9 as indicated by a character A. Some alternative positions of the band limiter 5 will be discussed on the assumption that the structure of the band limiter 5 is not changed. When the band limiter 5 is located at a position B as shown in FIG. 1, the high frequency components of prediction error signal are band-limited in association with the ratio of motion so that the amount of coded data associated with high frequency components is suppressed. This offers a slightly higher coding efficiency than in the case wherein band limitation is effected at the point A. Locating the band limiter 5 at another alternative point F is as effective as locating it at the point B because a signal appearing at the point F is simply a quantized version of the prediction error signal which appears at the point B. Further, when the band limiter 5 is located at a point E, the high frequency components of locally decoded signal are band-limited in association with the ratio of motion so that the accumulation of high frequency noise is eliminated to promote smooth coding.

Figure 6:
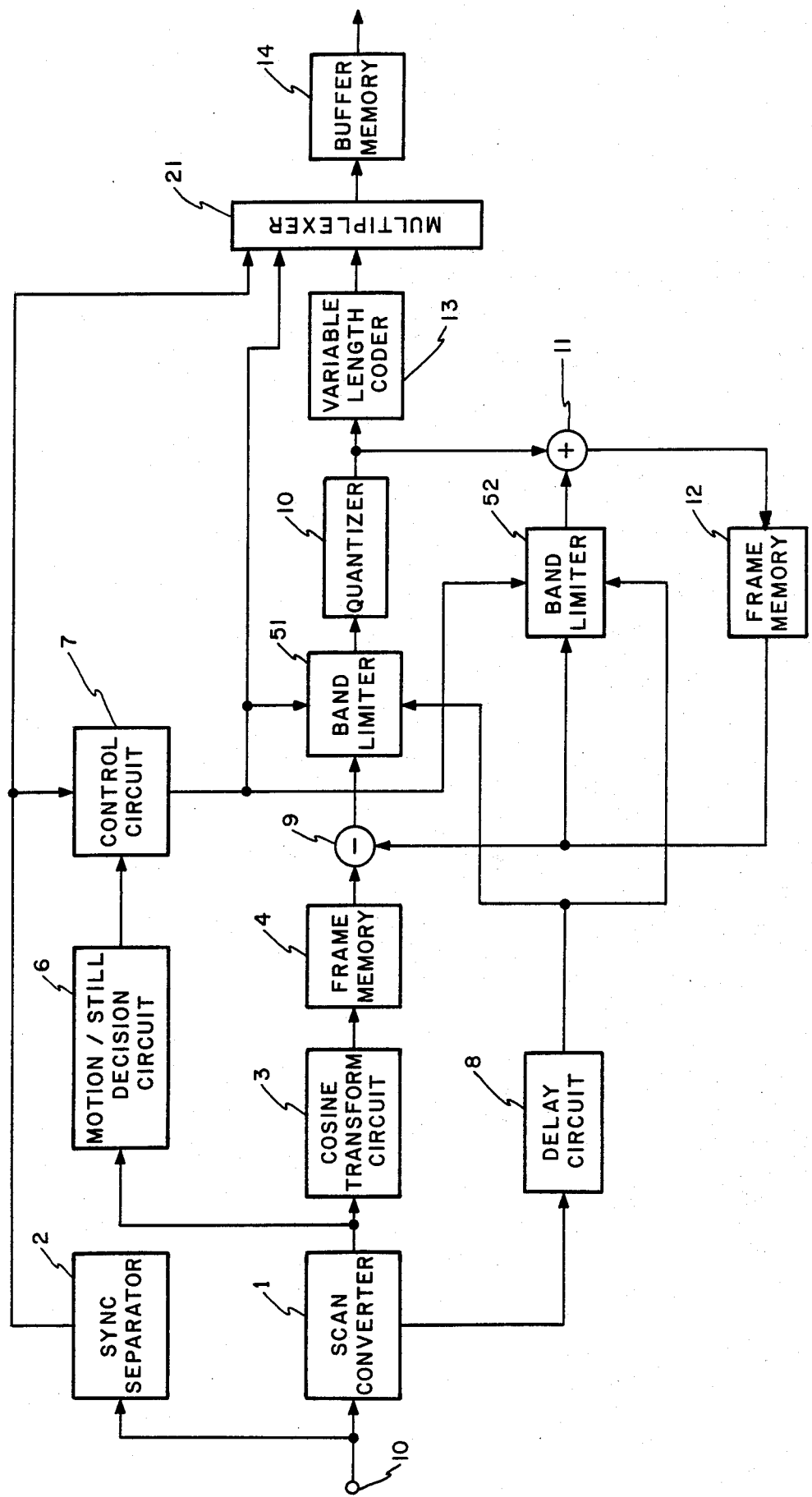
FIG. 6 is a schematic block diagram showing a second embodiment of the present invention.

Referring to FIG. 6, another embodiment of the present invention is shown. The embodiment is basically the same as the coding system of FIG. 1 except for the following: Two band limiters 51 and 52 are used and located at points B and C, respectively, and a band limit signal from the control circuit 7 which is adapted to allow a decoding system of FIG. 7 to operate with accuracy is newly multiplexed by a multiplexer 21. In this particular embodiment, the prediction error signal and the prediction signal which appear at the points B and D, respectively, are band-limited in association with the ratio of motion. This prevents high frequency components previously coded from being accumulated on the locally decoded signal and remaining as high frequency noise, thereby promoting coding which is attrative to the eye.

In the case that band limitation is effected at the point D or E, it is necessary to send a control signal indicative of a band limiting width to a decoding system as has been the case with the band limitation at the point C. When band limitation is performed at the points A and C or the points A and E, the same effect as the effect of locating band limiters at the points B and D is achievable because band limitation is applied to a prediction signal and an input signal to a prediction coding section, i.e., it in effect is applied to a prediction error signal and a prediction signal.

Figure 7:
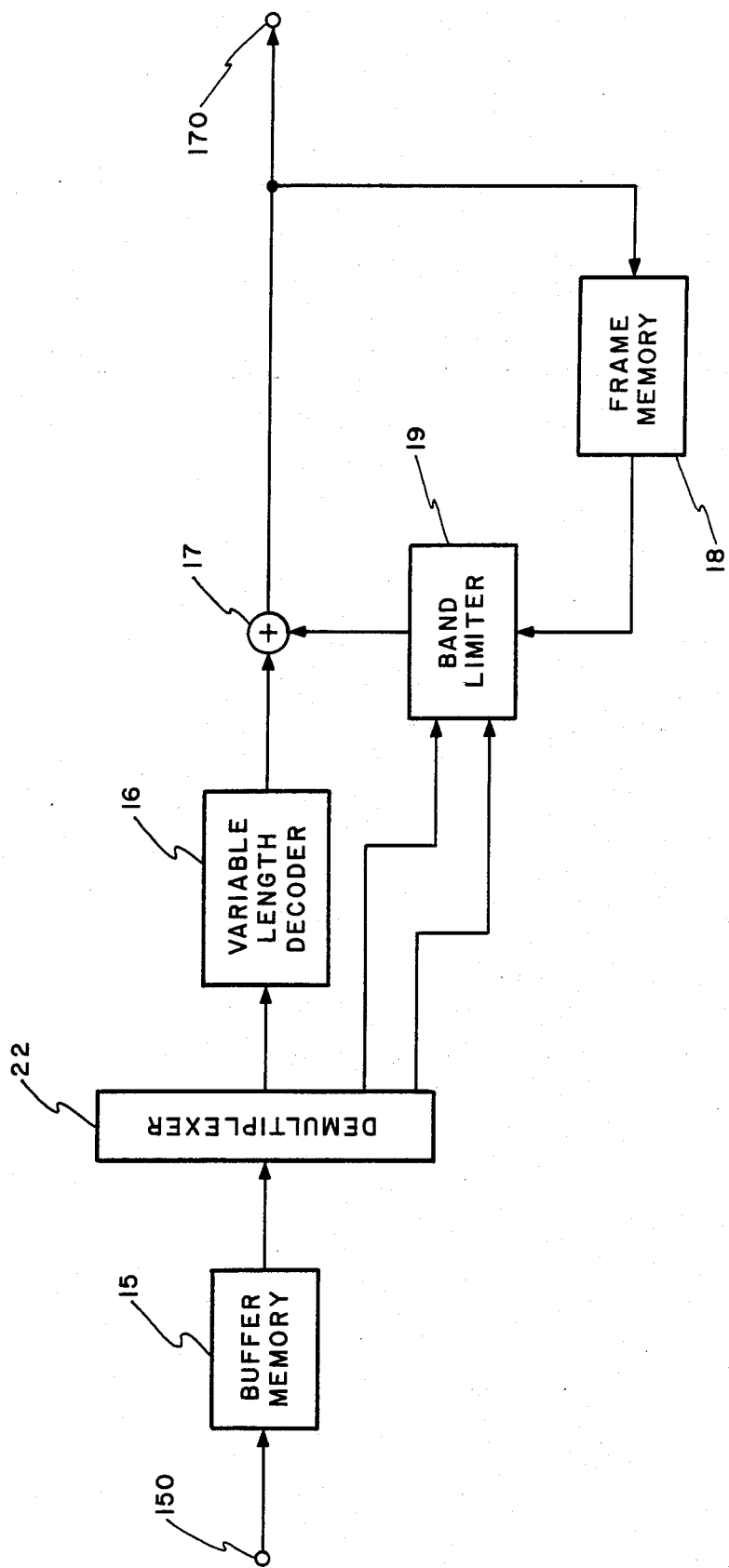
FIG. 7 is a schematic block diagram showing a decoding system for the coding system of FIG. 6.

FIG. 7 shows a decoding system for decoding a coded signal which is outputted by the coding system of FIG. 6. As shown, a coded signal coming in through a terminal 150 is temporarily stored in a buffer memory 15 and then applied to a demultiplexer 22. The demultiplexer 22 demultiplexes the input signal into a coded video signal, a synchronizing signal, and a band limit signal. The demultiplexer 22 also produce a block start signal based on the sync signal. A variable length decoder 16 decodes the coded video signal to produce a prediction error signal. An adder 17 adds the prediction error signal and a prediction signal which is outputted by a band limiter 19, producing a decoded signal. This decoded signal is fed out via a terminal 170 as an output of the decoding system while being applied to a frame memory 18. The frame memory 18 delays the decoded signal by about one frame period and feeds the delayed signal to the band limiter 19 as the prediction signal. The band limiter 19 band-limits the high frequency components of prediction signal in response to the block start signal and the band limit signal which is representative of a band limiting width and fed from the decoder 16. The output of the band limiter 19 is delivered to the adder 17.

In summary, it will be seen that the present invention provides a method and a system for transform coding a video signal capable of changing the band width of a signal to be adaptively coded in associated with a moving area of the video signal. This is effective to suppress a rash of data and therefore to eliminate discontinuity ascribable to the interruption of coding, whereby coding with smooth motion is achievable.

What is claimed is:

1. A method of coding a video signal by using transform coding, comprising the step of:
    limiting a signal produced by transform coding to a predetermined band depending upon a ratio of a motion area and a still area within a video signal frame.

2. A system for coding a video signal by using transform coding, comprising:
    calculating means for calculating a ratio of a motion area and a still area within an input video signal frame;
    means for generating a control signal indicative of a quantity of band limitation on the basis of an output of said calculating means;
    means for subjecting the input video frame to transform coding to produce a coded video signal;
    means for band-limiting the coded video signal in response to the control signal to thereby produce a band-limited video signal;
    means for producing a prediction error signal from the band-limited video signal and a prediction signal;
    quantitizing means for quanitizing the prediction error signal to produce a quanitized signal;
    means for generating a locally decoded signal from said quanitized signal and the prediction signal;
    frame memory means for delaying the locally decoded signal by one frame time before outputting said signal as the prediction signal; and
    means for variable-length-coding said quanitized signal.

3. A system for coding a video signal by using transform coding, comprising:
    calculating means for calculating a ratio of a motion area and a still area within an input video signal frame;
    means for producing a control signal indicative of a quantity of band limitation on the basis of an output of said calculating means;
    means for producing a coded video signal transform coding of the input video signal frame;
    means for producing a prediction error signal from the coded video signal and the prediction signal;
    first band limiting means for band-limiting the prediction error signal in response to the control signal to thereby produce a band-limited prediction error signal;
    quanitizing means for quanitizing the band-limited prediction error signal to produce a quanitized signal;
    second band limiting means for band-limiting the prediction signal in response to the control signal to thereby produce a band-limited prediction signal;
    means for producing a locally decoded signal from said quanitized signal and the band-limited prediction signal;
    a frame memory for delaying the locally decoded signal by one frame time to output the prediction signal; and
    means for variable-length-coding an output of said quanitized signal to output a coded signal; and
    means for multiplexing the coded signal and the control signal.

* * * * *